(12) United States Patent
Lee et al.

(10) Patent No.: US 11,677,094 B2
(45) Date of Patent: Jun. 13, 2023

(54) PLASMA GENERATING APPARATUS FOR SECONDARY BATTERY AND LAMINATION SYSTEM COMPRISING THE SAME

(71) Applicant: LG CHEM, LTD., Seoul (KR)

(72) Inventors: Sang Kyun Lee, Daejeon (KR); Sang Baek Ryu, Daejeon (KR); Kieun Sung, Daejeon (KR); Cha Hun Ku, Daejeon (KR); Duck Hoe Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 407 days.

(21) Appl. No.: 16/311,143

(22) PCT Filed: Jan. 9, 2018

(86) PCT No.: PCT/KR2018/000437
§ 371 (c)(1),
(2) Date: Dec. 18, 2018

(87) PCT Pub. No.: WO2018/155811
PCT Pub. Date: Aug. 30, 2018

(65) Prior Publication Data
US 2019/0207243 A1   Jul. 4, 2019

(30) Foreign Application Priority Data

Feb. 23, 2017   (KR) .................. 10-2017-0024217

(51) Int. Cl.
*H01M 10/04* (2006.01)
*H05H 1/48* (2006.01)
(Continued)

(52) U.S. Cl.
CPC ......... *H01M 10/0436* (2013.01); *H01M 4/04* (2013.01); *H01M 10/04* (2013.01);
(Continued)

(58) Field of Classification Search
CPC ............. H01M 10/04; H01M 10/0404; H01M 10/0436; H01M 10/052; H01M 10/0583;
(Continued)

(56) References Cited

U.S. PATENT DOCUMENTS 6,080,471 A  *  6/2000  Shigematsu ........ H01M 50/417
28/104
10,115,950 B2    10/2018  Lee et al.
(Continued)

FOREIGN PATENT DOCUMENTS

CN    103249865 A    8/2013
CN    103459661 A    12/2013
(Continued)

OTHER PUBLICATIONS

International Search Report for PCT/KR2018/000437 (PCT/ISA/210) dated Apr. 20, 2018.
(Continued)

*Primary Examiner* — Stewart A Fraser
*Assistant Examiner* — Lilia Nedialkova
(74) *Attorney, Agent, or Firm* — Birch, Stewart, Kolasch & Birch, LLP (57) ABSTRACT

A plasma generating apparatus for a secondary battery, including a roller part having a transfer roller configured to transfer a separator and a metal member built in the transfer roller, and a plasma generating part interacting with the metal member to generate plasma and thereby to form a mask that is patterned on a surface of the separator and has a bonding force.

15 Claims, 9 Drawing Sheets

(51) Int. Cl.
  *H01M 50/403* (2021.01)
  *H05H 1/24* (2006.01)
  *H01M 50/46* (2021.01)
  *H01M 4/04* (2006.01)
  *H01M 10/052* (2010.01)
  *H01M 10/0583* (2010.01)
  *H01M 10/0585* (2010.01)

(52) U.S. Cl.
  CPC ..... *H01M 10/0404* (2013.01); *H01M 50/403* (2021.01); *H01M 50/46* (2021.01); *H05H 1/48* (2013.01); *H01M 10/052* (2013.01); *H01M 10/0583* (2013.01); *H01M 10/0585* (2013.01); *H05H 1/2418* (2021.05); *H05H 1/2431* (2021.05); *H05H 1/47* (2021.05)

(58) Field of Classification Search
  CPC .. H01M 10/0585; H01M 4/04; H01M 50/403; H01M 50/46; H05H 1/2418; H05H 1/2431; H05H 1/47; H05H 1/48; Y02E 60/10; Y02P 70/50
  See application file for complete search history.

(56) References Cited

U.S. PATENT DOCUMENTS

| | | | |
|---|---|---|---|
| 2003/0082412 A1 | 5/2003 | Fukuda et al. | |
| 2003/0170472 A1 | 9/2003 | Fukuda et al. | |
| 2003/0228416 A1* | 12/2003 | Iwamaru | C23C 4/18 427/200 |
| 2005/0172899 A1 | 8/2005 | Fukuda et al. | |
| 2005/0181606 A1 | 8/2005 | Fukuda et al. | |
| 2006/0159999 A1* | 7/2006 | Kejha | H01M 50/411 429/231.8 |
| 2008/0268172 A1 | 10/2008 | Fukuda et al. | |
| 2010/0003599 A1 | 1/2010 | Nonoshita et al. | |
| 2011/0049100 A1* | 3/2011 | Han | H01J 37/32623 216/67 |
| 2011/0308457 A1* | 12/2011 | Simor | H05H 1/2406 118/719 |
| 2013/0269610 A1* | 10/2013 | Tamagaki | H01J 37/32752 118/723 R |
| 2014/0023796 A1 | 1/2014 | Ejiri et al. | |
| 2014/0057057 A1 | 2/2014 | Terai et al. | |
| 2015/0263324 A1* | 9/2015 | Lee | H01M 2/1646 429/145 |
| 2017/0218138 A1 | 8/2017 | Choi et al. | |
| 2017/0301958 A1* | 10/2017 | Deng | H01M 10/0404 |
| 2019/0207243 A1 | 7/2019 | Lee et al. | |

FOREIGN PATENT DOCUMENTS

| | | | |
|---|---|---|---|
| CN | 203381189 U | | 1/2014 |
| CN | 207883804 U | | 9/2018 |
| EP | 2205049 A1 | | 7/2010 |
| EP | 2894694 A1 | | 7/2015 |
| JP | 2013-122831 A | | 6/2013 |
| KR | 10-0846550 B1 | | 7/2008 |
| KR | 10-0958649 B1 | | 5/2010 |
| KR | 10-1361675 B1 | | 2/2014 |
| KR | 10-2014-0105695 A | | 9/2014 |
| KR | 20160028730 A | * | 3/2016 |
| KR | 1020160028730 A | | 3/2016 |
| KR | 10-2016-0054058 A | | 5/2016 |
| KR | 10-2016-0121177 A | | 10/2016 |
| KR | 20160126343 A | * | 11/2016 |
| KR | 1020160126343 A | | 11/2016 |

OTHER PUBLICATIONS

Supplementary European Search Report corresponding to European Patent Application No. 18757836.4 dated Jun. 11, 2019, 10 pages.

* cited by examiner

PLASMA GENERATING APPARATUS FOR SECONDARY BATTERY AND LAMINATION SYSTEM COMPRISING THE SAME

CROSS-REFERENCE TO RELATED APPLICATION

The present application claims the benefit of the priority of Korean Patent Application No. 10-2017-0024217, filed on Feb. 23, 2017, which is hereby incorporated by reference in its entirety.

TECHNICAL FIELD

The present invention relates to a plasma generating apparatus for a secondary battery and a lamination system comprising the same, and more particularly, to a plasma generating apparatus for a secondary battery, which generates plasma to form a mask patterned on a surface of a separator and having bonding force and a lamination system comprising the same.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Also, such a secondary battery is classified into a can type secondary battery in which an electrode assembly is built in a metal can and a pouch type secondary battery in which an electrode assembly is built in a pouch. The pouch type secondary battery comprises an electrode assembly, an electrolyte, and a pouch accommodating the electrode assembly and the electrolyte. Also, in the electrode assembly, a positive electrode and a negative electrode are disposed with a separator therebetween. An electrode tab is attached to each of the positive electrode and the negative electrode, and an electrode lead is coupled to each of the electrode tabs.

A lamination process is performed on the secondary battery to improve a bonding property of the electrode assembly in which the positive electrode, the separator, the negative electrode are laminated.

However, the secondary battery has a problem in which impregnation capability of the electrolyte is significantly reduced even though the positive electrode, the separator, and the negative electrode are improved in bonding property through the lamination process. Particularly, a gas generated between the positive electrode and the separator or between the negative electrode and the separator is not smoothly discharged, and thus, it is difficult to secure uniform quality of the electrode assembly.

DISCLOSURE OF THE INVENTION

Technical Problem

The present invention has been made to solve the above problem, and an object of the present invention is to provide a plasma generating apparatus for a secondary battery which improves bonding properties of a positive electrode, a separator, and a negative electrode and also improves impregnation capability and from which a gas is easily discharged and a lamination system comprising the same.

Technical Solution

To solve the above-described object, a plasma generating apparatus for a secondary battery according to the present invention comprises: a roller part comprising a transfer roller transferring a separator and a metal member built in the transfer roller; and a plasma generating part interacting with the metal member to generate plasma and thereby to form a mask that is patterned on a surface of the separator and has a bonding force.

The plasma generating part may comprise: a main body disposed in a width direction of the separator; and a plurality of electrode pieces disposed to be spaced apart from each other in a longitudinal direction of the main body to partially generate the plasma between the metal member and the main body and thereby to form a mask that is patterned on the surface of the separator and has the bonding force.

The plurality of electrode pieces may be disposed at the same interval or different intervals on the main body in the width direction of the separator.

The plurality of electrode pieces may have the same length, width, and thickness or have lengths, widths, and thicknesses of which at least one or more are different.

The plasma generating part may be provided with a plurality of electrode members connected to each other in the width direction of the separator, and each of the electrode members may comprise a main body disposed in the width direction of the separator and two or more electrode pieces disposed to be spaced apart from each other in directions of both ends of the main body to partially generate the plasma between the metal member and the main body and thereby to form the mask that is patterned on the surface of the separator and has the bonding force.

The plurality of electrode members may be detachably connected to each other.

The plasma generating part may further comprise a switch that applies power to one or more of the plurality of electrode members to generate the plasma.

The switch may comprise an on-off switch that supplies power to a selected one of the one or more of the plurality of electrode members and cuts off the power to the remaining electrode members that are not selected.

Each of the plurality of electrode members may comprise a coupling groove and a coupling protrusion, and the coupling groove of each of a plurality of the electrode members is coupled to the coupling protrusion of a respective adjacent electrode member of the plurality of electrode members so that the plurality of electrode members are detachably connected to each other.

The plurality of electrode members may have the same size or different sizes in the width direction of the separator.

The main body may be made of a non-metallic material.

The main body may be made of ceramic.

The electrode pieces may be provided as corona discharge electrodes.

Each of the electrode pieces may be inserted into an insertion groove defined in an outer surface of the main body.

The plasma generating part may form the mask that is patterned on each of both surfaces of the separator and has the bonding force.

The plasma generating part may form masks having different bonding force on both surfaces of the separator.

A lamination system according to the present invention comprises: a plurality of supply rollers supplying an electrode and a separator to be alternately laminated; a first cutter cutting the electrode; a plasma generating apparatus forming a mask that is patterned on a surface of the separator and has bonding force; a laminator thermally fusing the electrode and the separator to manufacture a radical unit; and a second cutter cutting the radial unit to a predetermined size, wherein the plasma generating apparatus forms the mask, which is patterned on the surface of the separator and has the bonding force, before the separator and the electrode are thermally fused to each other.

Advantageous Effects

The present invention has effects as follows.

1. The plasma generating apparatus according to the present invention may comprise the mask patterned on the surface of the separator and having the bonding force. Thus, the positive electrode, the separator, and the negative electrode may be improved in bonding property, and particularly, the electrolyte may be introduced into the space between the patterned masks, or the gas may be discharged through the space between the patterned masks to improve the impregnation capability of the electrolyte and the discharge performance of the gas.

2. The plasma generating apparatus according to the present invention may comprise the roller part comprising the metal member and the plasma generating part comprising the plurality of electrode pieces. Thus, the plasma may be partially generated between the roller part and the plasma generating part to form the mask patterned on the surface of the separator and having the bonding force.

3. The plurality of electrode pieces according to the present invention may be provided at the same interval or at different intervals. Accordingly, the masks formed on the surface of the separator may be adjusted in interval therebetween, and thus, the bonding force may be adjusted according to the surface of the separator.

4. The plasma generating part according to the present invention may comprise the plurality of electrode members, and thus, the plurality of electrode members may be used to be connected to each other according to the size of the separator, thereby improving compatibleness and reducing the product purchasing cost.

5. The plurality of electrode members according to the present invention may be detachably connected to each other to improve the assembly convenience.

6. According to the present invention, the power may be applied to one or two or more of the plurality of electrode members through the switch to generate the plasma, thereby forming the mask having the various patterns on the surface of the separator.

7. The plurality of electrode members according to the present invention may have the same size or sides different from each other to form the mask having the various sizes on the surface of the separator.

8. The plasma generating part according to the present invention may form the mask patterned on both surfaces of the separator and having bonding force different from each other. Particularly, the bonding force of the positive electrode, the separator, and the negative electrode may be uniformly adjusted.

9. The lamination system may comprise the plasma generating apparatus to manufacture the electrode assembly having the uniform quality.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

First Embodiment of the Present Invention

Structure of Radical Unit

Figure 1:
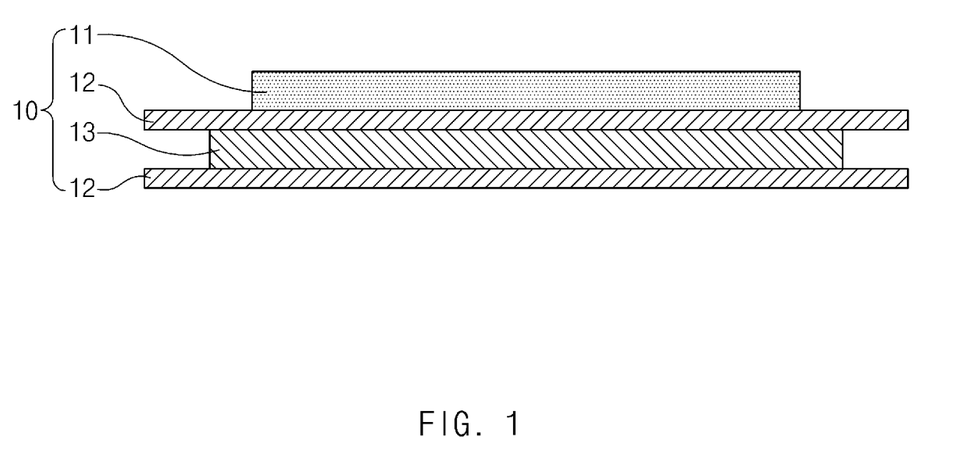
FIG. 1 is a cross-sectional view of a radical unit according to a first embodiment of the present invention.

In a radical unit according to the first embodiment of the present invention, an electrode and a separator are alternately disposed. Here, the electrode and the separator may be arranged in the same number or in different numbers. For example, as illustrated in FIG. 1, the radical unit 10 may be formed by successively laminating two electrodes 11 and 13 and two separators 12. Here, the two electrodes may be a positive electrode and a negative electrode, and the positive electrode and the negative electrode may face each other through the separator. Thus, the radical unit 10 has a structure in which the positive electrode, the separator, the negative electrode, and the separator are laminated.

Structure of Electrode Assembly

Figure 2:
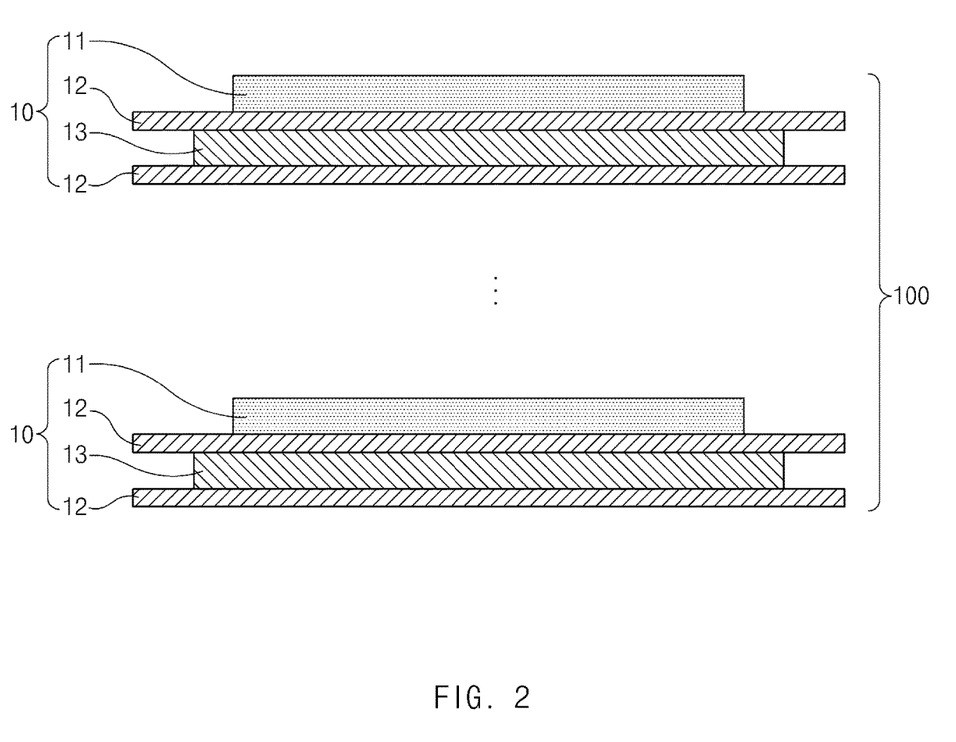
FIG. 2 is a cross-sectional view of an electrode assembly according to the first embodiment of the present invention.

The electrode assembly 100 according to the first embodiment of the present invention may be formed by repeatedly laminating one kind of radical unit 10 or two kinds or more of radical units 10 in a predetermined order.

For example, as illustrated in FIG. 2, a plurality of radical units 10 having the same lamination structure are laminated in a vertical direction. That is, the electrode assembly 100 according to the first embodiment of the present invention may have a structure in which the radical unit 10 having a four-layered structure, in which the first electrode that is the positive electrode, the separator 12, the second electrode 13 that is the negative electrode, and the separator 12 are successively laminated, is repeatedly laminated.

The radical unit 10 is manufactured through a lamination system. Here, the radical unit 10 may be improved in bonding property, electrolyte impregnation capability, and gas discharge performance through the lamination system 200.

Lamination System

Figure 3:
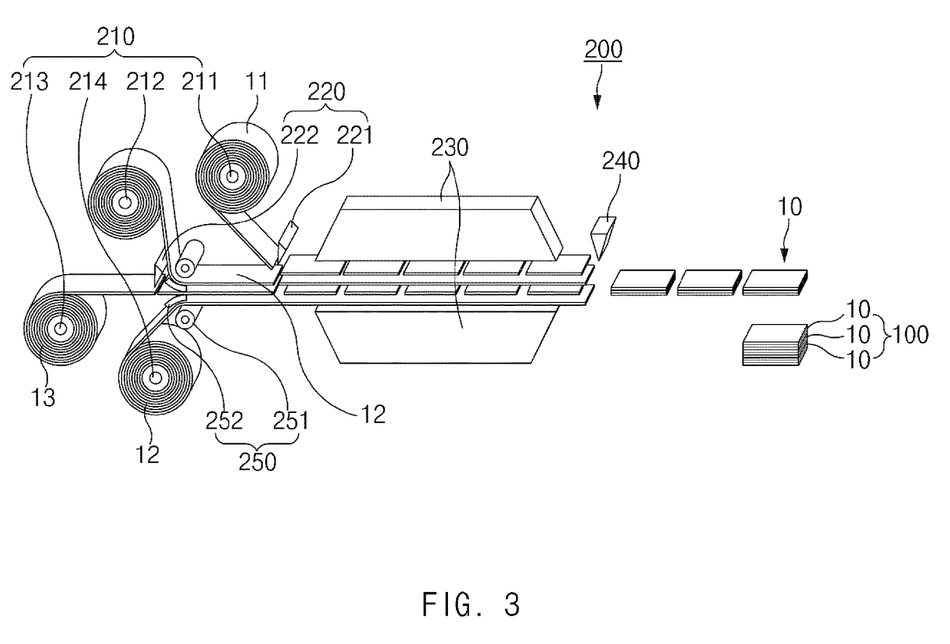
FIG. 3 is a view of a lamination system according to the first embodiment of the present invention.

As illustrated in FIG. 3, a lamination system 200 according to the first embodiment of the present invention may comprise a plurality of supply rollers 210 supplying the electrodes 11 and 13 and the separators 12 to be alternately laminated, a first cutter 220 cutting the electrodes 11 and 13, a laminator 230 thermally fusing the electrodes 11 and 13 and the separator 12 to manufacture a radical unit sheet, and a second cutter 240 cutting the radical unit sheet by a predetermined size to manufacture a radical unit 10.

The plurality of supply rollers 210 comprises a first electrode supply roller 211 supplying the first electrode that is the positive electrode, a second electrode supply roller 213 supplying the second electrode that is the negative electrode, a first separator supply roller 212 supplying one separator 12, and a second separator supply roller 214 supplying the other separator 12.

The first cutter 220 comprises a first cutter member 221 cutting the first electrode 11 by a predetermined size and a second cutter member 222 cutting the second electrode 13 by a predetermined size.

The lamination 230 applies heat to bond the electrodes 11 and 13 to the separator 12 while pressing the electrodes 11 and 13 and the separator 12.

The second cutter 240 cuts the separator 12 between the electrodes 11 and 13 corresponding to each other to manufacture the radical unit 10.

According to the present invention comprising the above-described constituents, the radical unit 10 in which the electrodes 11 and 13 and the separator 12 are alternately laminated may be manufactured through the lamination system 200 according to the first embodiment. A plurality of radical units 10 may be laminated to manufacture the electrode assembly 100.

The lamination system 200 according to the first embodiment of the present invention may comprise a plasma generating apparatus 250 to improve a bonding property, electrolyte impregnation capability, and gas discharge performance of the radical unit 10.

Figure 4:
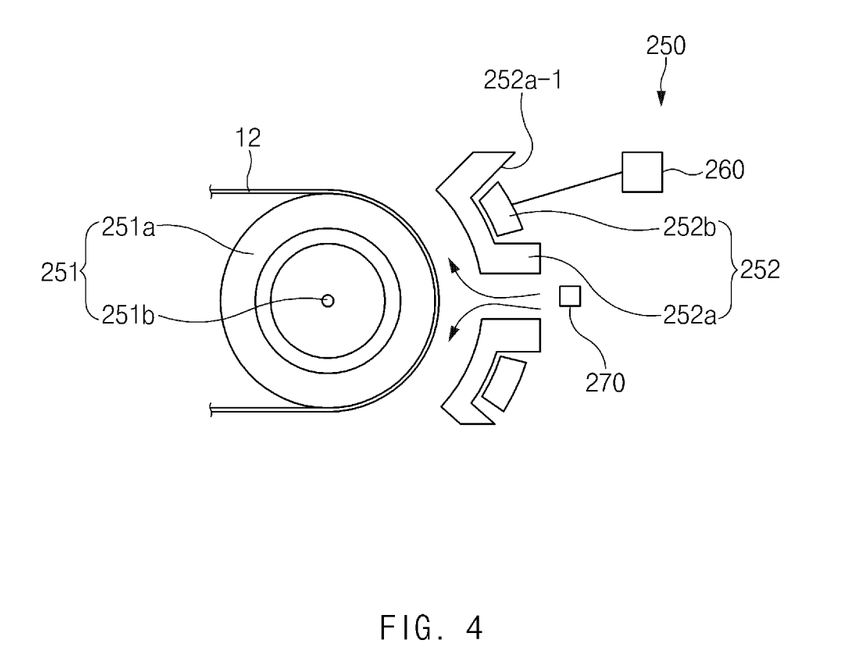
FIG. 4 is a cross-sectional view of a plasma generating apparatus according to the first embodiment of the present invention.
Figure 7:
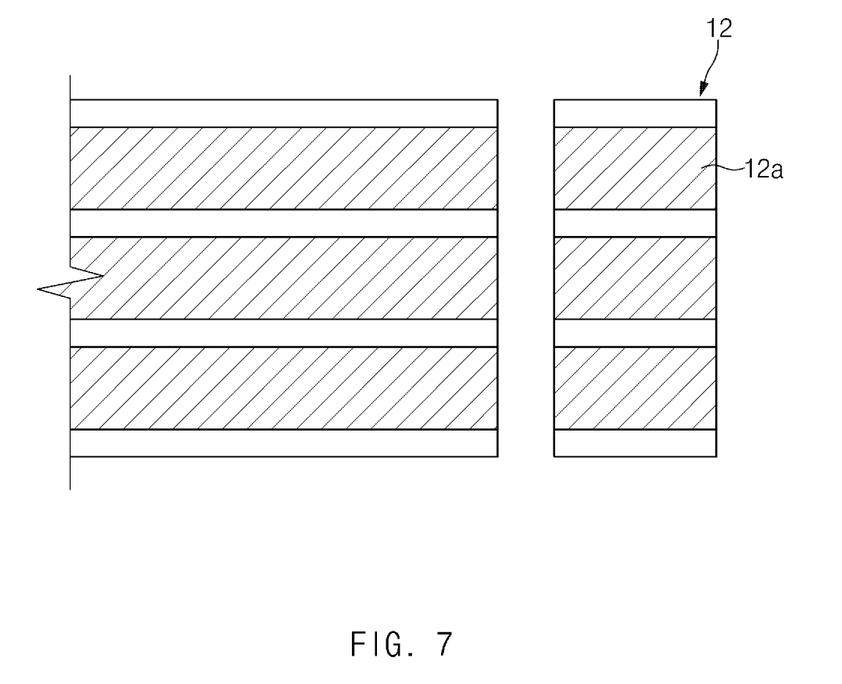
FIG. 7 is a front view of a separator according to the first embodiment of the present invention.

As illustrated in FIGS. 3, 4, and 7, the plasma generating apparatus 250 may be provided on each of one separator 12 disposed between the first separator supply roller 213 and the laminator 230 and one separator 12 disposed between the second separator supply roller 214 and the laminator 230, and a mask patterned on a surface of the separator 12 and having bonding force is disposed before the electrodes 11 and 13 and the separator 12 are bonded to each other.

For example, referring to FIG. 7, the plasma generating apparatus 250 may comprise the mask 12a that is patterned on the surface of the separator 12 and has high bonding force may be provided. Thus, the masks 12a may adhere to the electrode to improve the bonding property between the electrode and the separator. Particularly, an electrolyte and a gas may pass through a space between the mask 12a and the 12a, which are patterned on the surface of the separator 12 and have the bonding force to improve the electrolyte impregnation capability and the gas discharge performance.

That is, the plasma generating apparatus 250 comprises a roller part 251 and a plasma generating part 252.

The roller part 251 is provided with a transfer roller 251a supporting one surface of the separator 12 and transferring the separator 12 and a metal member 251b built in the transfer roller 251a.

The plasma generating part 252 is disposed to be spaced apart from the other surface of the separator 12 to generate plasma through interaction with the metal member 251b, thereby forming the mask patterned on the surface of the separator 12 and having the bonding force.

For example, the plasma generating part 252 comprises a main body 252a disposed in a width direction of the separator 12 and a plurality of electrode pieces 252b spaced apart from the main body 252a in a longitudinal direction to partially generate plasma between the metal member 251b and the main body 252b and thereby to form the mask 12a that is patterned on the surface of the separator 12 and has the bonding force. The electrode pieces 252b are illustrated as a hatched portion in FIG. 5.

The main body 252a may be made of a non-metallic material. Thus, an occurrence of resistance between the metal member 251b and the electrode pieces 252b may be prevented to stably generate plasma between the metal member 151b and the main body 252a.

The main body 252a may be made of ceramic of the non-metallic material. The ceramic is a non-metallic inorganic material obtained through a thermal treatment process and has heat resistance, high strength, and corrosion resistance. Particularly, since the ceramic is lightweight, efficiency of use may be improved.

Figure 5:
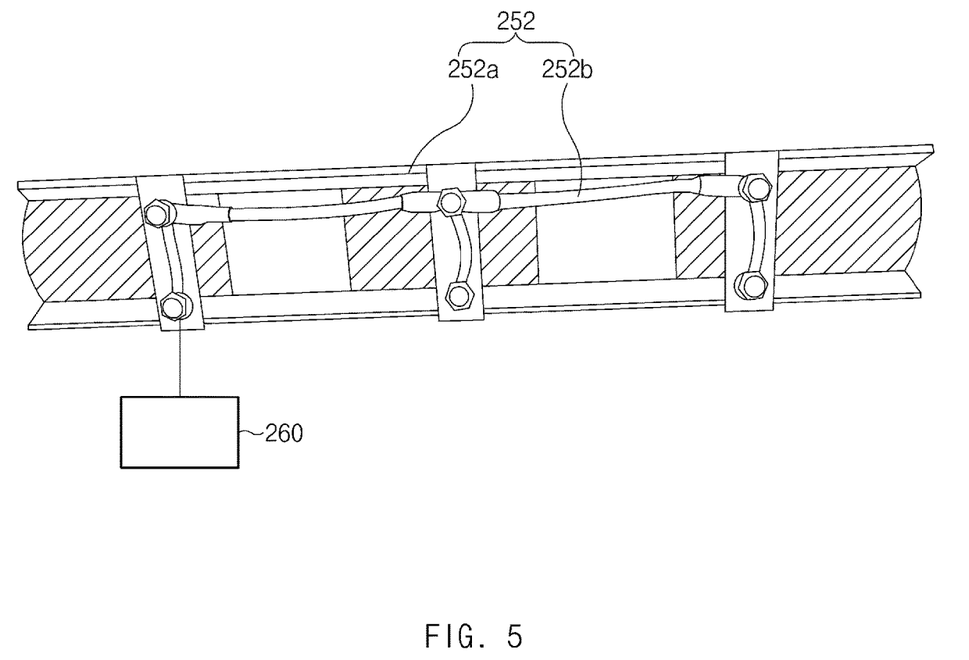
FIG. 5 is a front view of the plasma generating apparatus according to the first embodiment of the present invention.

The plurality of electrode pieces 252b is disposed to be spaced apart from an outer surface of the main body 252a in the longitudinal direction without being disposed toward the separator 12. Three electrode pieces 252b spaced apart from each other are illustrated in FIG. 5.

Each of the plurality of electrode pieces 252b may be a corona discharge electrode. The plasma may be stably generated between the metal member 151b and the main body 252a through the corona discharge electrode.

The plurality of electrode pieces 252b may be disposed at the same interval or at different intervals on the main body 252a in the width direction.

For example, when the plurality of electrode pieces 252b are disposed at the same interval on the main body 252a in the width direction of the separator 12, the separator 12 and the entire electrode may be uniformly bonded to each other to manufacture the radical unit 10 and the electrode assembly 100, which have uniform quality.

For another example, the plurality of electrode pieces 252b may be disposed at different intervals on the main body 252a in the width direction of the separator 12. That is, since an edge of the separator 12 requires large bonding force, a distance between the electrode pieces 252b may be narrow. On the other hand, since a center of the separator 12 does not require large bonding force, a distance between the electrode pieces 252b is wide.

The plurality of electrode pieces 252b may have the same length, width, and thickness or may have lengths, widths, and thicknesses of which at least one or more are different. Thus, a mask 12a having various patterns and bonding force may be formed on the surface of the separator 12.

An insertion groove 252a-1 lengthily defined in the main body 252a in the width direction of the separator 12. The plurality of electrode pieces 252b having an insertion protrusion 252a-2 are inserted to be fixed to the insertion groove 252a-1 so as to be spaced apart from each other. Thus, the electrode pieces 252b may be prevented from being damaged by an external object to stably generate the plasma.

Figure 6:
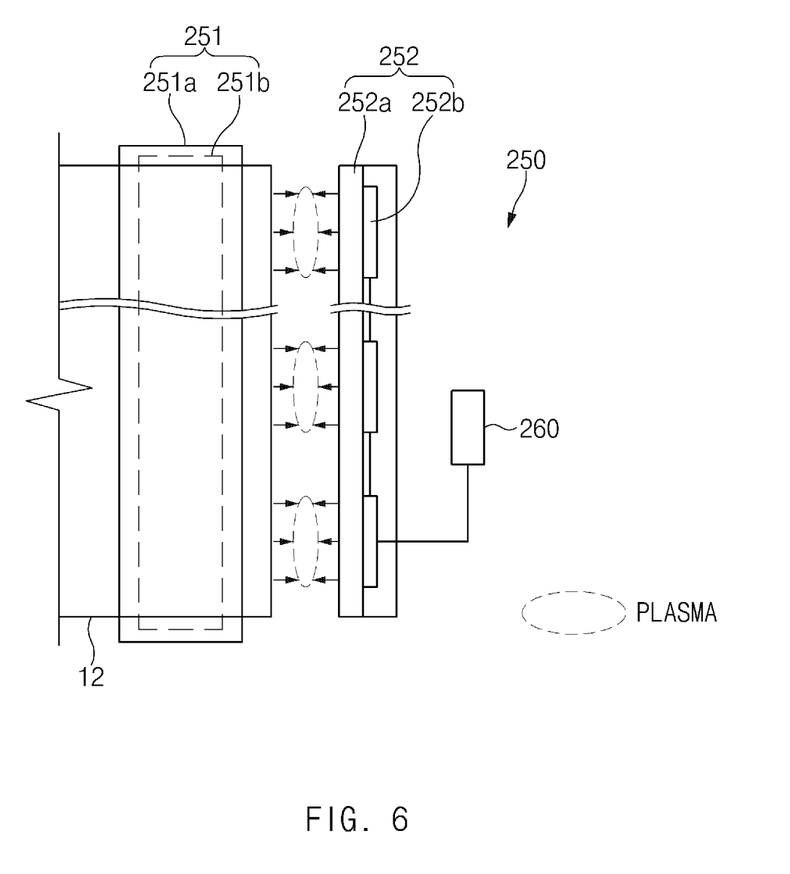
FIG. 6 is a cross-sectional view illustrating an operation state of the plasma generating apparatus according to the first embodiment of the present invention.

As illustrated in FIG. 6, in the plasma generating apparatus 250 having the above-described configuration, the metal member 251b and the electrode pieces 252b may correspond to each other to generate the plasma. Thus, the mask 12a that is patterned on the surface of the separator 12 between the metal member 251b and the electrode pieces 225b and has the bonding force may be formed.

The plasma generating apparatus 250 comprises a switch 260 applying power to the plurality of electrode pieces 252b to generate the plasma. Whether the plurality of electrode pieces 252b are used may be easily controlled by the switch 260. Here, the electrode piece 252b and the electrode piece 252b may be connected to each other through a wire that electrically connects the electrode pieces 252b to each other.

The plasma generating apparatus 250 may form a mask 12a that is patterned on each of both surfaces of the separator 12 and has bonding force. Thus, the electrodes 11 and 13 bonded to both the surfaces of the separator 12 may be stably bonded with the enhanced bonding force, and also, the electrolyte impregnation capability and the gas discharge performance may be improved.

The plasma generating apparatus 250 may form a mask having different bonding force on each of both surfaces of the separator 12. Thus, the electrodes 11 and 13 bonded to both the surfaces of the separator 12 may be adjusted to have different bonding force. If necessary, the electrodes 11 and 13 may be adjusted to have the same bonding force.

The plasma generating apparatus 250 may further comprise an air supply member 270 supplying air between the roller part 251 and the plasma generating part 252. The air supply member 270 may supply the air between the roller part 251 and the plasma generating part 252 to more stabilize the plasma. That is, the more uniform and stable plasma discharge may occur to produce a uniform result.

The lamination system 200 according to the first embodiment of the present invention may obtain the separator on which the mask that is patterned and has the bonding force through the plasma generating apparatus 250 as illustrated in FIG. 7.

Also, in the lamination system 200 according to the first embodiment of the present invention, the separator 12 on which the mask that is patterned and has the bonding force is formed and the electrodes 11 and 13 are alternately laminated and then cut to manufacture the radical unit 10 having the uniform quality. Then, the plurality of radical units having the uniform quality may be laminated to manufacture the electrode assembly 100 having the uniform quality.

Hereinafter, in descriptions of another embodiment of the present invention, constituents having the same constituent and function as the abovementioned embodiment have been given the same reference numeral in the drawings, and thus duplicated description will be omitted.

Second Embodiment of the Present Invention

Figure 8:
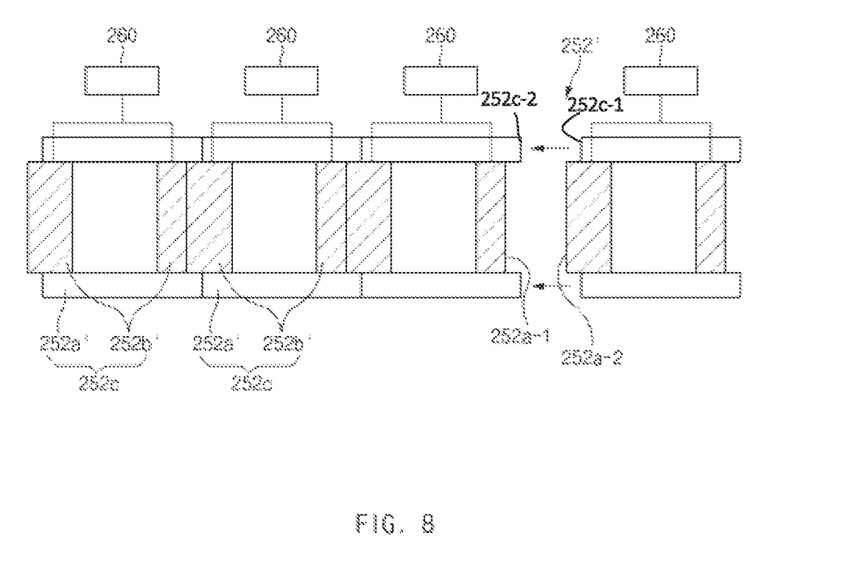
FIG. 8 is a front view of a plasma generating apparatus according to a second embodiment of the present invention.
Figure 9:
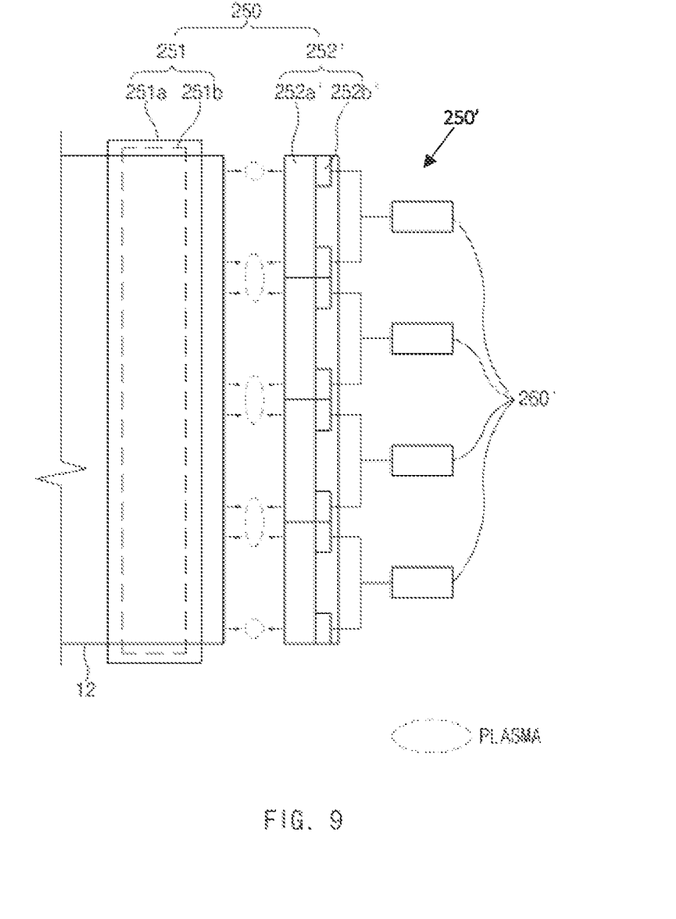
FIG. 9 is a cross-sectional view illustrating an operation state of the plasma generating apparatus according to the second embodiment of the present invention.

As illustrated in FIGS. 8 and 9, a plasma generating apparatus 250' according to a second embodiment of the present invention comprises a transfer roller 251a transferring a separator 12, a roller part provided with a metal member 251b built in the transfer roller 251a, and a plasma generating part 252' generating plasma by interaction with the metal member 251b to form a mask that is patterned on a surface of the separator 12 and has bonding force.

Here, the roller part 251 have the same configuration and function as the roller part described according to the first embodiment, and thus, its detailed description will be omitted.

The plasma generating part 252' may b provided as a plurality of electrode members 252c connected to each other in a width of the separator 12. Here, the electrode member 252c may comprise a main body 252a' and a plurality of electrode pieces 252b'.

Particularly, the electrode member 252c may comprise a main body 252a' disposed in a width direction of the separator 12 and a plurality of electrode pieces 252b' disposed to be spaced apart from each other in directions of both ends of the main body 252a' to partially generate plasma between the metal member 251b and the main body 252a' and thereby to form a mask that is patterned on a surface of the separator 12 and has bonding force.

Referring to FIG. 8, the plasma generating part 252' is manufactured by connecting the plurality of electrode members 252c to each other. A plurality of main bodies 252a' are connected to each other in the width direction of the separator 12, and the electrode pieces 252b' may be respectively disposed on both ends of the main bodies 252a'. Thus, the plurality of electrode members 252c, which match the width of the separator 12, are connected to each other to assembly the plasma generating part 252'.

In the plasma generating part 252', the plurality of electrode members 252c may be detachably connected to each other. For example, each of the plurality of electrode members 252c has a coupling groove 252c-1 and a coupling protrusion 252c-2 on surfaces corresponding to each other, and the coupling groove 252c-1 and the coupling protrusion 252c-2 are coupled to each other so that the electrode members 252c are detachably connected to each other. Therefore, efficiency and convenience of assembly may be improved.

In the plasma generating part 252', the plurality of electrode members 252c may have the same size or different sizes in the width direction of the separator 12. Each of the electrode pieces 252b' may increase in size to correspond to that of each of the plurality of electrode members 252c. Thus, the mask having various sizes and shapes may be formed on the surface of the separator.

Referring to FIG. 9, the plasma generating part 252' may comprise a switch 260' applying power to one or two or more of the plurality of electrode members 252c to generate the plasma. The switch 260' may be an on-off switch that supplies power to a specific electrode member 252c selected from the plurality of electrode members 252c and cuts off power to the remaining electrode members 252c that are not selected.

The switch 260' may select only the electrode member 252c in which the plasma has to be generated to generate the plasma. Thus, the mask that is patterned in a desired shape or at a desired position on the surface of the separator 12 and has the bonding force may be formed.

Thus, the plasma generating apparatus 250' according to the second embodiment of the present invention may comprise the plurality of electrode members 252c. Thus, the plasma generating apparatus 250' may be compatibly used irrespective of the size of the separator, and thus, efficiency and convenience of use and cost saving may be improved.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:
1. A plasma generating apparatus comprising:
a roller part comprising a transfer roller transferring a separator and a metal member built in the transfer roller; and
a plasma generating part interacting with the metal member to generate plasma and thereby to form a mask that is patterned on a surface of the separator and has a bonding force,
wherein the plasma generating part comprises:
a main body disposed in a width direction of the separator; and a plurality of electrode pieces disposed to be spaced apart from each other in a longitudinal direction of the main body to partially generate the plasma between the metal member and the main body and thereby to form the mask that is patterned on the surface of the separator and has the bonding force, wherein the plurality of electrode pieces are sequentially arranged at intervals along the longitudinal direction of the main body, the longitudinal direction of the main body being the same direction as the width direction of the separator, wherein a space gap is present between the main body of the plasma generating part and the transfer roller so that the roller part and the plasma generating part are separated by the space gap, wherein the plasma generating part is located outside of the transfer roller so that the separator is configured to be located between an outer peripheral surface of the transfer roller and an inner surface of the main body facing the transfer roller and the separator, wherein the plasma generating part is provided with a plurality of electrode members connected to each other in the width direction of the separator, and wherein each of the plurality of electrode members comprises a main body piece disposed in the width direction of the separator and two or more electrode pieces disposed to be spaced apart from each other in directions of both ends of the main body piece to partially generate the plasma between the metal member and the main body piece and thereby to form the mask that is patterned on the surface of the separator and has the bonding force.

2. The plasma generating apparatus of claim 1, wherein the plurality of electrode pieces are disposed at the same interval or different intervals on the main body in the width direction of the separator.

3. The plasma generating apparatus of claim 1, wherein the plurality of electrode pieces have the same length, width, and thickness or have lengths, widths, and thicknesses of which at least one or more are different.

4. The plasma generating apparatus of claim 1, wherein the plurality of electrode members are detachably connected to each other.

5. The plasma generating apparatus of claim 4, wherein each of the plurality of electrode members comprises a coupling groove and a coupling protrusion, and the coupling groove of each of the plurality of electrode members is coupled to the coupling protrusion of a respective adjacent electrode member of the plurality of electrode members so that the plurality of electrode members are detachably connected to each other.

6. The plasma generating apparatus of claim 1, wherein the plasma generating part further comprises a switch that applies power to one or more of the plurality of electrode members to generate the plasma.

7. The plasma generating apparatus of claim 6, wherein the switch comprises an on-off switch that supplies power to a selected one of the one or more of the plurality of electrode members and cuts off the power to the remaining electrode members that are not selected.

8. The plasma generating apparatus of claim 1, wherein the plurality of electrode members have the same size or different sizes in the width direction of the separator.

9. The plasma generating apparatus of claim 1, wherein the main body is made of a non-metallic material.

10. The plasma generating apparatus of claim 9, wherein the main body is made of ceramic.

11. The plasma generating apparatus of claim 1, wherein the electrode pieces are provided as corona discharge electrodes.

12. The plasma generating apparatus of claim 1, wherein each of the electrode pieces is inserted into an insertion groove defined in an outer surface of the main body, and
wherein the outer surface is opposite from the inner surface of the main body.

13. The plasma generating apparatus of claim 1, wherein the plasma generating part forms the mask that is patterned on each of both surfaces of the separator and has the bonding force.

14. The plasma generating apparatus of claim 1, wherein the plasma generating part forms masks having different bonding force on both surfaces of the separator.

15. A lamination system comprising:
a plurality of supply rollers supplying an electrode and a separator to be alternately laminated;
a first cutter cutting the electrode;
the plasma generating apparatus of claim 1, configured to form a mask that is patterned on a surface of the separator and has bonding force;
a laminator thermally fusing the electrode and the separator to manufacture a radical unit; and
a second cutter cutting the radical unit to a predetermined size,
wherein the plasma generating apparatus forms the mask, which is patterned on the surface of the separator and has the bonding force, before the separator and the electrode are thermally fused to each other.

\* \* \* \* \*